(12) United States Patent
Arumugam et al.

(10) Patent No.: US 7,375,177 B2
(45) Date of Patent: May 20, 2008

(54) POLYMERS, POLYMER COMPOSITIONS AND METHOD OF PREPARATION

(75) Inventors: Nagarajan Arumugam, Tamilnadu (IN); Radhakrishna Arakali Srinivasarao, Bangalore (IN); Jan Pleun Lens, Z-Holland (NL); Tilak Raj, Bangalore (IN); Binod Sahoo, Orissa (IN); Subash Scindia, Bangalore (IN)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 11/289,210

(22) Filed: Nov. 29, 2005

(65) Prior Publication Data

US 2007/0123683 A1  May 31, 2007

(51) Int. Cl.
*C08G 64/00* (2006.01)
(52) U.S. Cl. .................. 528/196; 264/176.1; 264/219; 525/439; 528/198
(58) Field of Classification Search ............. 264/176.1, 264/219; 525/439; 528/196, 198, 190; 250/472.1, 250/474.1; 428/411.1, 412
See application file for complete search history.

(56) References Cited

U.S. PATENT DOCUMENTS

| | | | |
|---|---|---|---|
| 2,772,162 A | 11/1956 | Salminen et al. |
| 2,865,751 A | 12/1958 | Feniak et al. |
| 3,856,748 A | 12/1974 | Dexter et al. |
| 4,577,042 A | 3/1986 | Collins et al. |
| 5,130,454 A | 7/1992 | Hickmann et al. |
| 5,130,481 A | 7/1992 | Khanna et al. |
| 5,157,066 A | 10/1992 | Shoji et al. |

OTHER PUBLICATIONS

Wen, et al., N, N'-Bis(p-methoxyphenyl)-2, 2'-(m-phenylenedioxy)diacetamide, Acta Crystallographica, Section E: Structure Reports Online, vol. 1, E61, No. 1, 2005, pp. 096-097, XP002427919.

Wen, et al., N, N'-Bis(p-methoxyphenyl)-2, 2'-(m-phenylenedioxy)diacetamide, Acta Crystallographica, Section E: Structure Reports Online, vol. 1, E60, No. 10, 2004, pp. 01702-01703, XP002427920.

Wang, et al., Phase transfer catalyzed synthesis of N, N'-diaryl-1, 2-phenylene dioxydiacetamides, Synthetic Communications, vol. 26, No. 14, 1996, pp. 2765-2773, XP009081779.

Hikosaka, et al, "Electrographic photoreceptor containing polycarbonate binder resin in photosensitive layer", XP002427928, 4 pages.

JP8248650, "Electrophotographic Photosensitive Material", Abstract Only, 1 page.

International Search Report for International Application No. PCT/US2006/045456, mailed Apr. 18, 2007, 7 pages.

*Primary Examiner*—Terressa Boykin

(57) ABSTRACT

A polymer comprising at least one structural unit derived from a dihydroxy compound of Formula (I)

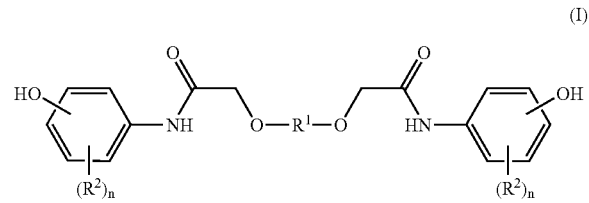

wherein $R^1$ is an aromatic divalent functionality having 6 to 60 carbons, $R^2$ can be the same or different at each occurrence and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and "n" is an integer having a value 0 to 3.

31 Claims, No Drawings

POLYMERS, POLYMER COMPOSITIONS AND METHOD OF PREPARATION

BACKGROUND OF THE INVENTION

This disclosure relates to polymers prepared using dihydroxy compounds. More particularly this disclosure relates to polycarbonates prepared using dihydroxy compounds, methods of preparing the polycarbonate and polycarbonate resins, compositions comprising the polycarbonate and polycarbonate resins, and uses thereof.

Polymers are useful in the manufacture of articles and components for a wide range of applications, from automotive parts to electronic appliances. Because of their broad use, particularly in high heat applications and in other applications, it is desirable to provide polymers with high glass transition temperature (Tg), high refractive index (RI), chemical resistance, and barrier properties.

Accordingly, there is a continuing need for new compounds that will provide polymers with better chemical resistance and at the same time retaining high Tg values, to enable their use in forming a gamut of articles.

SUMMARY OF THE INVENTION

Disclosed herein is a polymer comprising at least one structural unit derived from a dihydroxy compound of Formula (I)

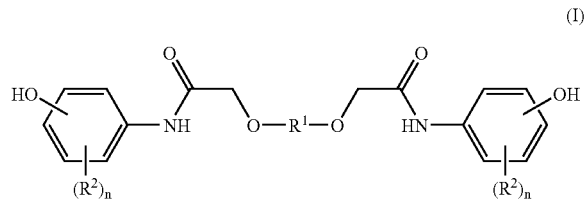

(I)

wherein $R^1$ is an aromatic functionality having 6 to 60 carbons, $R^2$ at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4.

In one embodiment a process for preparing a polymer comprising structural units derived from a dihydroxy compound of Formula (I) comprises polymerizing a dihydroxy compound of Formula (I).

Also disclosed herein are compositions comprising the polymer and articles comprising the polymer.

The above-described and other features are exemplified by the following detailed description.

DETAILED DESCRIPTION OF THE INVENTION

Disclosed herein are polymers prepared using dihydroxy compounds. These polymers can be used in high heat and optical applications.

The singular forms "a", "an" and "the" include plural referents unless the context clearly dictates otherwise. All ranges disclosed herein are inclusive and combinable (for example ranges of "up to 25 weight (wt.) percent, with 5 wt. percent to 20 wt. percent desired," is inclusive of the endpoints and all intermediate values of the ranges of "5 wt. percent to 25 wt. percent").

The modifier "about" used in connection with a quantity is inclusive of the stated value and has the meaning dictated by the context (for example, includes the degree of error associated with measurement of the particular quantity)

"BPA" is herein defined as bisphenol A and is also known as 2,2-bis(4-hydroxyphenyl)propane, 4,4'-isopropylidenediphenol and p,p-BPA.

Unless otherwise specified, the term "cycloaliphatic functionality" designates cyclic aliphatic functionalities having a valence of at least one and comprising an array of atoms which is cyclic but which is not aromatic. A "cycloaliphatic functionality" may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). The cycloaliphatic functionality may include heteroatoms such as nitrogen, sulfur, selenium, silicon and oxygen, or may be composed exclusively of carbon and hydrogen. For convenience, the term "cycloaliphatic functionality" is defined herein to encompass a wide range of functional groups such as alkyl groups, alkenyl groups, alkynyl groups, haloalkyl groups, conjugated dienyl groups, alcohol groups, ether groups, carboxylic acid groups, acyl groups (for example carboxylic acid derivatives such as esters and amides), amine groups and nitro groups. For example, the 4-methylcyclopent-1-yl group is a $C_6$ cycloaliphatic functionality comprising a methyl group, wherein the methyl group is a functional group which is an alkyl group. Similarly, the 2-nitrocyclobut-1-yl group is a $C_4$ cycloaliphatic functionality comprising a nitro group, wherein the nitro group is a functional group. A cycloaliphatic functionality may comprise one or more halogen atoms which may be the same or different. Exemplary cycloaliphatic functionalities comprise cyclopropyl, cyclobutyl, 1,1,4,4-tetramethylcyclobutyl, piperidinyl, 2,2,6,6-tetramethylpiperydinyl, cyclohexyl, and cyclopentyl.

As used herein, the term "aromatic functionality" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic functionality" includes but is not limited to, phenyl, pyridyl, furanyl, thienyl, naphthyl, phenylene, and biphenyl functionalities. The aromatic functionality may also include nonaromatic components. For example, a benzyl group is an aromatic functionality that comprises a phenyl ring (the aromatic group) and a methylene group (the nonaromatic component). Similarly a tetrahydronaphthyl functionality is an aromatic functionality comprising an aromatic group ($C_6H_3$) fused to a nonaromatic component ($CH_2$)$_4$. For convenience, the term "aromatic functionality" is defined herein to encompass a wide range of functional groups such as alkyl groups, haloalkyl groups, haloaromatic groups, alcohol groups, ether groups, carboxylic acid groups, acyl groups (for example carboxylic acid derivatives such as esters and amides), amine groups and nitro groups. For example, the 4-methylphenyl functionality is a $C_7$ aromatic functionality comprising a methyl group, wherein the methyl group is a functional group which is an alkyl group. Similarly, the 2-nitrophenyl group is a $C_6$ aromatic functionality comprising a nitro group, wherein the nitro group is a functional group. Aromatic functionalities include halogenated aromatic functionalities. Exemplary aromatic functionalities include, but are not limited to, phenyl, 4-trifluoromethylphenyl, 4-chloromethylphen-1-yl, 3-trichloromethylphen-1-yl (3-CCl$_3$Ph-), 4-(3-bromoprop-1-yl)phen-1-yl (4-BrCH$_2$CH$_2$CH$_2$Ph-), 4-aminophen-1-yl (4-H$_2$NPh-), 4-hydroxymethylphen-1-yl (4-HOCH$_2$Ph-), 4-methylthiophen-1-yl (4-CH$_3$SPh-), 3-methoxyphen-1-yl and 2-nitromethylphen-1-yl (2-NO$_2$CH$_2$Ph), and naphthyl.

As used herein the term "aliphatic functionality" refers to a linear or branched array of atoms that is not cyclic and has a valence of at least one. Aliphatic functionalities are defined to comprise at least one carbon atom. The array of atoms may include heteroatoms such as nitrogen, sulfur, silicon, selenium and oxygen or may be composed exclusively of carbon and hydrogen. For convenience, the term "aliphatic functionality" is defined herein to encompass, as part of the "linear or branched array of atoms which is not cyclic" a wide range of functional groups such as alkyl groups, haloalkyl groups, alcohol groups, ether groups, carboxylic acid groups, acyl groups (for example carboxylic acid derivatives such as esters and amides), amine groups and nitro groups. For example, the 4-methylpent-1-yl is a $C_6$ aliphatic functionality comprising a methyl group, wherein the methyl group is a functional group which is an alkyl group. Similarly, the 4-nitrobut-1-yl group is a $C_4$ aliphatic functionality comprising a nitro group, wherein the nitro group is a functional group. An aliphatic functionality may be a haloalkyl group which comprises one or more halogen atoms which may be the same or different. Exemplary aliphatic functionalities include, but are not limited to, methyl, ethyl, propyl, isopropyl, butyl, isobutyl, pentyl, isopentyl, trifluoromethyl, bromodifluoromethyl, chlorodifluoromethyl, chloromethyl, trichloromethyl, bromoethyl, 2-hexyl, hexamethylene, hydroxymethyl (i.e., CH$_2$OH), mercaptomethyl (CH$_2$SH), methylthio (SCH$_3$), methylthiomethyl (CH$_2$SCH$_3$), methoxy, methoxycarbonyl (CH$_3$OCO), nitromethyl (CH$_2$NO$_2$) and thiocarbonyl.

In one embodiment a polymer comprises at least one structural unit derived from a dihydroxy compound of Formula (I)

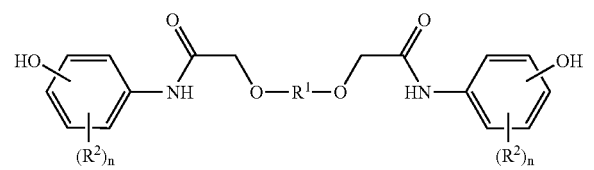

(I)

wherein $R^1$ is an aromatic functionality having 6 to 60 carbons, $R^2$ at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4. A variety of polymers may comprise the structural units derived from the dihydroxy compound of Formula (I), including, but not limited to, polycarbonate, polyester, copolyester-polycarbonate, polyurethane, and epoxide containing polymers.

In one embodiment a polycarbonate comprises at least one structural unit derived from a dihydroxy compound of Formula (XI)

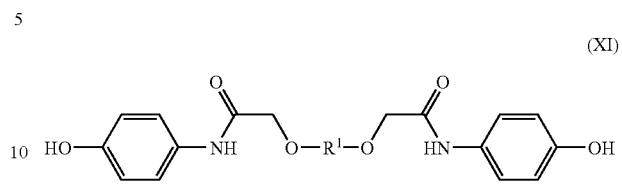

(XI)

wherein $R^1$ is an aromatic divalent functionality derived from hydroquinone, resorcinol, methyl hydroquinone or bisphenol A.

In one embodiment the dihydroxy compound of Formula (I) may be prepared by reacting a compound of Formula (XXII) with a compound of Formula (XXIII) in the presence of a first catalyst to produce a compound of Formula (XXIV)

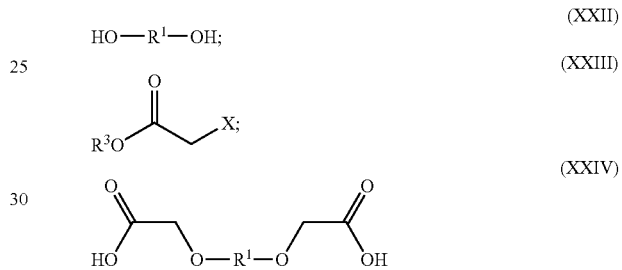

reacting the compound of Formula (XXIV) in the presence of a second catalyst with a halogenating agent to provide the corresponding diacid halide having Formula (XXV)

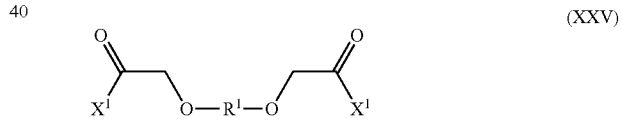

(XXV)

and reacting the compound of Formula (XXV) with a compound of Formula (XXVI) to produce a compound of Formula I

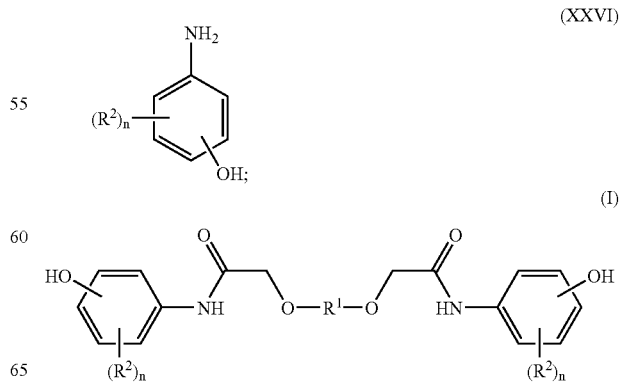

wherein R¹ is an aromatic functionality having 6 to 60 carbons, R² at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4; R³ is selected from the group consisting of a hydrogen and an aliphatic functionality having 1 to 10 carbons; X and X¹ are independently at each occurrence a halogen. When R³ is an aliphatic functionality the reaction of a compound of Formula (XXII) and a compound of Formula (XXIII) yields a diester which can be hydrolyzed to form the compound of Formula (XXIV).

Further details regarding the synthesis of dihydroxy compounds of Formulas (I), (XIX), (XX), and (XXI) can be found in copending application Ser. No. 11/289,215 filed concurrently herewith.

In one embodiment the dihydroxy aromatic compound comprises compounds of Formula (XIX), Formula (XX), Formula (XXI), or Formula (XXVII).

R¹ may be derived from bisphenol compounds having Formula (II),

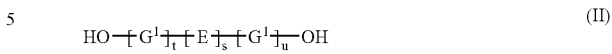

wherein each $G^1$ is independently at each occurrence an aromatic functionality having 6 to 20 carbons; E is independently at each occurrence, a cycloaliphatic functionality having 3 to 20 carbons, an aromatic functionality having 6 to 20 carbons, an aliphatic functionality having 1 to 20 carbons, a sulfur-containing linkage (for example, —S—, —SO—, —SO₂—), a selenium-containing linkage (for example, —Se—, —SeO—, —SeO₂—), a phosphorus-containing linkage, or an oxygen atom; "t" is a number greater than or equal to one and less than or equal to 10,000; "s" is either zero or one; "u" is a whole number including zero to 10,000. When "s" equals zero then $[G^1]_t$ is bonded to $[G^1]_u$.

Exemplary compounds having Formula (II) include, but are not limited to 1,1-bis(4-hydroxyphenyl)cyclopentane;

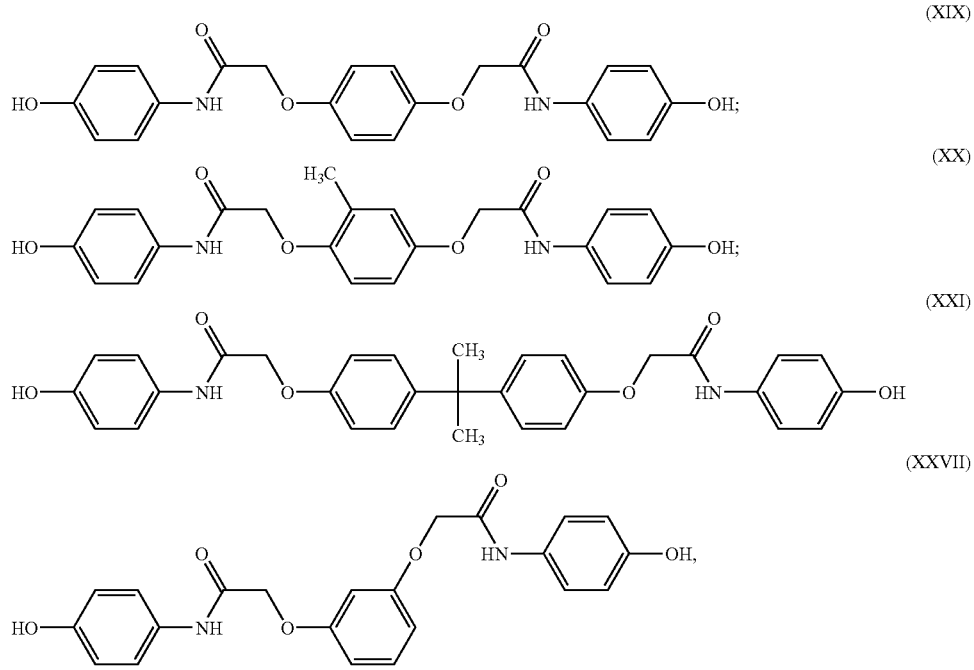

wherein R¹ is derived from hydroquinone in Formula (XIX), from methyl hydroquinone in Formula (XX), from bisphenol A in Formula (XXI) and from resorcinol in Formula (XXVII), and "n" in Formula (XIX), Formula (XX), Formula (XXI) and Formula (XXVII) is 0. The compound of Formula (XIX), Formula (XX) Formula (XXI) and Formula (XXVII) may hereinafter also be referred to as N-(4-hydroxy-phenyl)-2-[4-[(4-hydroxy-phenylcarbomoyl)-methoxy]-phenoxy]-acetamide; N-(4-hydroxy-phenyl)-2-[4-[(4-hydroxy-phenylcarbomoyl)-methoxy]-2-methyl-phenoxy]-acetamide, N-(4-hydroxy-phenyl)-2-(4-(1-methyl-1-[4-(4-hydroxyphenlycarbomyl-methoxy)-phenyl]-ethyl)-phenoxy)-acetamide and N-(4-hydroxyphenyl)-2-(3-[(4-hydroxyphenylcarbomoyl)-methoxy]-phenoxy)-acetamide respectively.

2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2-bis(3-methyl-4-hydroxyphenyl)propane; 1,1-bis(4-hydroxyphenyl)norbornane; 1,2-bis(4-hydroxyphenyl)ethane; bis(4-hydroxyphenyl) sulfide; 4,4'-oxydiphenol; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 2,2-bis(4-hydroxyphenyl)propane (bisphenol A); 1,1-bis(4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dimethyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetramethylphenyl)propane; 2,2-bis(4-hydroxy-3-ethylphenyl)propane; 2,2-bis(4-hydroxy-3,5-dimethylphenyl)propane; 1,1-bis(4-hydroxyphenyl) cyclohexylmethane; 2,2-bis(4-hydroxyphenyl)-1-phenylpropane; 1,1-bis(4-hydroxyphenyl)cyclohexane; 11,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8-BHPM); 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetramethylphenyl)cyclohexane; 1,1-bis(4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dimethyl-4-hydroxyphenyl)-3,3,5-; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetramethylphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl) cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene) diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; methyl hydroquinone; resorcinol; $C_{1-3}$alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and combinations of two or more of the foregoing.

"Polycarbonates" and "polycarbonate resins" as used herein are polymers comprising structural units represented by Formula (III):

wherein at least about 60 percent of the total number of $R^4$ groups are aromatic functionalities and the balance thereof are aliphatic, alicyclic, or aromatic functionalities and further wherein at least one $R^4$ group is derived from a dihydroxy compound of Formula (I).

The aromatic functionality may comprise a functionality of the Formula (IV):

wherein each of $A^1$ and $A^2$ is a monocyclic divalent aromatic functionality and $Y^1$ is a bridging functionality having one or two atoms that separate $A^1$ from $A^2$. In an exemplary embodiment, one atom separates $A^1$ from $A^2$. Illustrative non-limiting examples of functionalities of this type are —O—, —S—, —S(O)—, —S(O)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. In one embodiment, the bridging functionality $Y^1$ may be a hydrocarbon group or a saturated hydrocarbon group such as methylene, cyclohexylidene, or isopropylidene.

"Polyesters" as used herein may comprise repeating structural units of the Formula (V)

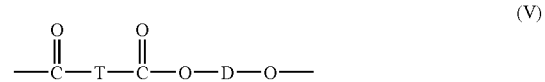

wherein D is derived from a divalent functionality derived from a dihydroxy compound, and may be, for example, a cycloaliphatic functionality having 6 to 10 carbon atoms, an aromatic functionality having 6 to 20 carbon atoms or an aliphatic functionality having 2 to 10 carbon atoms and wherein at least one of D are derived from a dihydroxy compound of Formula (I); and T is a divalent functionality derived from a dicarboxylic acid, and may be, for example, a cycloaliphatic functionality having 6 to 10 carbon atoms, an aromatic functionality having 6 to 20 carbon atoms or an aliphatic functionality having 2 to 10 carbon atoms.

In one embodiment, D comprises an aliphatic functionality having 2 to 10 carbon atoms. In another embodiment, D may be derived from an aromatic dihydroxy compound of Formula (VI):

wherein each $R^f$ is independently a halogen atom, an aliphatic functionality having 1 to 10 carbon atoms and "m" is an integer having a value 0 to 4. Examples of compounds that may be represented by the Formula (VI) include, but are not limited to resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

In one embodiment "T" is a divalent functionality derived from a dicarboxylic acid compound of Formula (XII)

(XII)

wherein $R^5$ is independently at each occurrence hydroxy, chloro, or $OR^6$, wherein $R^6$ is independently at each occurrence selected from the group consisting of an aliphatic functionality having 1 to 10 carbons, a cycloaliphatic functionality having 3 to 10 carbons, and an aromatic functionality having 6 to 20 carbons. In one embodiment the divalent functionality "T" comprises a cycloaliphatic functionality having 6 to 10 carbon atoms, an aromatic functionality having 6 to 10 carbon atoms, or an aliphatic functionality having 2 to 10 carbon atoms.

Examples of dicarboxylic acids that may be used to prepare the polyesters include, but are not limited to 1,6-hexanedioic acid, phthalic acid, isophthalic acid, terephthalic acid, fumaric acid, maleic acid, azelaic acid, glutaric acid, adipic acid, suberic acid, sebacic acid, malonic acid, succinic acid, 1,2-di(p-carboxyphenyl)ethane, 4,4'-dicarboxydiphenyl ether, 4,4'-bisbenzoic acid, and combinations comprising two or more of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D comprises a $C_{2-6}$ alkylene functionality and T comprises p-phenylene, m-phenylene, naphthalene, a divalent cycloaliphatic functionality, or a combination of two or more of the foregoing. This class of polyester includes the poly (alkylene terephthalates).

"Copolyester-polycarbonate" or "copolyestercarbonate" or "polyester carbonate" as used herein are copolymers containing recurring carbonate units of Formula (III) in addition to the repeating units of Formula (V) as defined above. In one embodiment either repeating carbonate units of Formula (III) or repeating units of Formula (V) or repeating units of both Formula (III) and Formula (V) comprise at least one structural unit derived from the dihydroxy compound of Formula (I).

Polyurethane as used herein are polymers containing recurring units having Formula (VII)

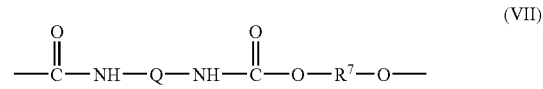

(VII)

wherein $O—R^7—O$ is a divalent functionality derived from a dihydroxy compound or a polyhydroxy compound; wherein at least one of $R^7$ is derived from a dihydroxy compound of Formula (I); and wherein "Q" is a divalent functionality derived from a diisocyanate compound, having Formula (VIII)

(VIII)

wherein Q comprises a divalent aliphatic functionality having 2 to 28 carbons, a divalent cycloaliphatic functionality having 4 to 15 carbons, or a divalent aromatic functionality having 6 to 15 carbons.

Examples of dicarboxylic acids that may be used to prepare the polyurethanes include, but are not limited to, 1,6-hexanedioc acid, phthalic acid, isophthalic acid, terephthalic acid, fumaric acid, maleic acid, azelaic acid, glutaric acid, adipic acid, suberic acid, sebacic acid, malonic acid, succinic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. In one embodiment the dicarboxylic acids used are 1,6-hexanedioc acid terephthalic acid, isophthalic acid, naphthalene dicarboxylic acid, cyclohexane dicarboxylic acid, or combinations of two or more of the foregoing dicarboxylic acids.

Suitable examples of diisocyanate include but are not limited to, toluene-2,6-diisocyanate, 1,6-hexamethylene diisocyanate, 4,4'-diphenyl methane diisocyanate, 2,4'-diphenyl methane diisocyanate, 1,3-phenylene diisocyanate, 1,4-phenylene diisocyanate, toluene-2,4-diisocyanate, and combinations of two or more of the foregoing diisocyanate compounds.

Epoxide-containing polymer as used herein are polymers having the structure of Formula (IX)

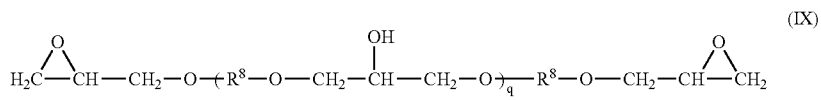

(IX)

wherein $R^8$ is a divalent functionality derived from a dihydroxy compound; wherein at least one of $R^8$ is derived from a dihydroxy compound of Formula (I); and wherein "q" is 2 to about 200.

The polymers described above may be a homopolymer containing structural units derived from a single dihydroxy compound represented by Formula (I) or a copolymer comprising structural units derived from two or more of the dihydroxy compound represented by Formula (I) or may be a copolymer comprising structural units derived from one or more dihydroxy compound represented by Formula (I) and structural units derived from other dihydroxy compounds. Accordingly, in one embodiment the polymer may comprise 1 mole percent to about 100 mole percent of units derived from a dihydroxy compound of Formula (I). Within this range the amount may be greater than or equal to about 5 mole percent, or, more specifically, greater than or equal to about 10 mole percent. Also within this range the amount may be less than or equal to about 80 mole percent, or, more specifically less than or equal to about 50 mole percent.

In one embodiment the dihydroxy compounds that may be useful in forming the copolymer with the dihydroxy compound of Formula (I) may be represented by Formula (XIII)

HO—R$^9$—OH  (XIII), wherein R$^9$ includes a functionality of Formula (IV),

-A$^1$-Y$^1$-A$^2$-;  (IV)

and wherein Y$^1$, A$^1$ and A$^2$ are as defined above. In another embodiment the dihydroxy compound includes bisphenol compounds of general Formula (XIV):

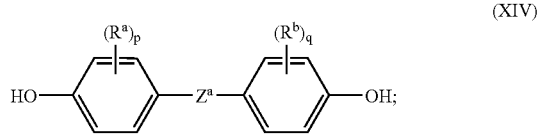

(XIV)

wherein R$^a$ and R$^b$ each represent a halogen atom or an aliphatic functionality having 1 to 10 carbon atoms and may be the same or different; p and q are each independently integers of 0 to 4; and Z$^a$ represents one of the groups of Formula (XV):

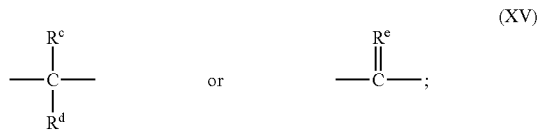

(XV)

wherein R$^c$ and R$^d$ each independently represent a hydrogen atom or an aliphatic functionality having 1 to 10 carbon atoms or a cycloaliphatic functionality having 3 to 10 carbon atoms and R$^e$ is a divalent aliphatic functionality having 1 to 10 carbon atoms.

Some illustrative, non-limiting examples of suitable dihydroxy compounds that may be used in combination with the dihydroxy compound of Formula (I) include, but are not limited to the following: resorcinol, 4-bromoresorcinol, hydroquinone, methyl hydroquinone, 1,1-bis-(4-hydroxy-3-methylphenyl)cyclohexane, 2-phenyl-3,3-bis(4-hydroxyphenyl)phthalimidine, eugenol siloxane bisphenol, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, as well as combinations comprising at least one of the foregoing dihydroxy compounds.

Specific examples of the types of bisphenol compounds may include, but are not limited to 1,1-bis(4-hydroxyphenyl)methane, 1,1-bis(4-hydroxyphenyl)ethane, 2,2-bis(4-hydroxyphenyl)propane(bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising two or more of the foregoing dihydroxy compounds may also be used. In one embodiment the bisphenol compound employed is bisphenol A.

The polymer may be a branched polymer. Branched polymers comprising structural units derived from the dihydroxy compound of Formula (I) may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include, but are not limited to trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol-PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. All types of polycarbonate end groups are contemplated as being useful in the polycarbonate composition, provided that such end groups do not significantly affect desired properties of the thermoplastic compositions.

In one specific embodiment, the polymer is a polycarbonate wherein the polycarbonate is a linear homopolymer derived from dihydroxy compounds of Formula (I) or a copolymer comprising repeating units derived from dihydroxy compounds of Formula (I) and repeating units derived from bisphenol A. In one embodiment the polycarbonate may have a Tg greater than or equal to 140° C., or, more specifically, greater than or equal to 150° C., or, even more specifically greater than or equal to 160° C. Polycarbonates having a high Tg are also contemplated. The polycarbonate may have a weight average molecular weight of about 10,000 to about 200,000, or, more specifically, about 20,000 to about 100,000 as measured by gel permeation chromatography based on polystyrene standards.

Polycarbonates, polyesters and copolyester-carbonates may be manufactured by processes such as interfacial polymerization and melt polymerization. Although the reaction conditions for interfacial polymerization may vary, an exemplary process generally involves dissolving or dispersing a dihydroxy compound in aqueous sodium hydroxide or potassium hydroxide, adding the resulting mixture to a suitable water-immiscible solvent medium, and contacting the reactants with a carbonate precursor in the presence of a suitable catalyst such as triethylamine or a phase transfer catalyst, under controlled pH conditions, for example, about 8 to about 10. The most commonly used water immiscible solvents include, but are not limited to methylene chloride, 1,2-dichloroethane, chlorobenzene and toluene. Suitable carbonate precursors include, for example, a carbonyl halide such as carbonyl bromide or carbonyl chloride, or a haloformate such as a bishaloformate of a dihydric phenol (for example, the bischloroformates of bisphenol A, hydroquinone, or the like) or a glycol (for example, the bishaloformate of ethylene glycol, neopentyl glycol, polyethylene glycol, or the like) or esters (for example, bismethylsalicylate (bMSC)) or diphenyl carbonate (DPC). Combinations comprising at least one of the foregoing types of carbonate precursors may also be used. The resultant polymers, may have a weight average molecular weight (Mw) of about 10,000 to about 200,000, or, more specifically, about 20,000 to about 100,000 as measured by gel permeation chromatography based on polystyrene standards.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; and monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives. Specifically, mono-phenolic chain-stoppers include phenol, p-cumylphenol, and resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; mono-carboxylic acid chlorides such as trimellitic anhydride chloride, and naphthoyl chloride; and mixtures of monocyclic and mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

Among the phase transfer catalysts that may be used are catalysts of the Formula $(R^g)_4Y^+X^5$, wherein each $R^g$ is the same or different, and is an alkyl group having 1 to 10 carbon atoms; Y is a nitrogen or phosphorus atom; and $X^5$ is a halogen atom or an aliphatic functionality having 1 to 8 carbon atoms or aromatic functionality having 6 to 188 carbon atoms. Suitable phase transfer catalysts include, for example, $[CH_3(CH_2)_3]_4NX^5$, $[CH_3(CH_2)_3]_4PX^5$, $[CH_3(CH_2)_5]_4NX^5$, $[CH_3(CH_2)_6]_4NX^5$, $[CH_3(CH_2)_4]_4NX^5$, $CH_3[CH_3(CH_2)_3]_3NX^5$, and $CH_3[CH_3(CH_2)_2]_3NX^5$, wherein $X^5$ is chloride, bromide, an aliphatic functionality having 1 to 8 carbon atoms or aromatic functionality having 6 to 188 carbon atoms. An effective amount of a phase transfer catalyst may be about 0.1 to about 10 wt. percent based on the weight of bisphenol in the phosgenation mixture. In another embodiment an effective amount of phase transfer catalyst may be about 0.5 to about 2 wt. percent based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, bis methyl salicylate or a combination thereof, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The transesterifcation catalysts capable of effecting reaction between the ester and the dihydroxy compound may comprise a single compound or a mixture of compounds and may be employed in combination with one or more co-catalysts such as quaternary ammonium salts or quaternary phosphonium salts. Suitable transesterification catalysts include, but are not limited to, alkali metal hydroxides, for example, lithium hydroxide, sodium hydroxide, potassium hydroxide, and mixtures thereof; alkaline earth metal hydroxides, for example, calcium hydroxide, barium hydroxide, and mixtures thereof; alkali metal salts of carboxylic acids, for example, lithium acetate, sodium benzoate, and dipotassium dodecanedioate; alkaline earth metal salts of carboxylic acids, for example, calcium benzoate, calcium adipate, and barium acetate; salts of a polycarboxylic acid, for example, tetrasodium ethylenediamine tetracarboxylate and disodium magnesium ethylenediamine tetracarboxylate and salts of non-volatile acids, for example, alkaline earth metal salts of phosphates, alkali metal salts of phosphates, alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include $NaH_2PO_3$, $NaH_2PO_4$, $Na_2H_2PO_3$, $KH_2PO_4$, $CsH_2PO_4$, $CsH_2PO_4$, $Cs_2H_2PO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and mixtures thereof. As used herein the term "non-volatile acid" means that the acid from which the catalyst is made has no appreciable vapor pressure under melt polymerization conditions. Examples of non-volatile acids include phosphorous acid, phosphoric acid, sulfuric acid, and metal "oxo acids" such as the oxo acids of germanium, antimony, niobium and the like.

As mentioned, melt polymerization may be practiced using a co-catalyst. Typically, the co-catalyst is a quaternary ammonium salt or quaternary phosphonium salt and is used in an amount corresponding to about 10 to about 250 times the molar amount of melt polymerization catalyst used. The catalyst and co-catalyst, may be added to the reaction mixture either simultaneously, or the catalyst and co-catalyst may be added separately at different stages of the polymerization reaction.

When activated carbonate precursors (i.e., carbonate precursors that react faster than diphenyl carbonate) such as bMSC are used to make the polycarbonate, polyester and copolyester-carbonate polymers described herein the polymers can comprise certain physical differences compared to similar polymers prepared using other melt or interfacial methods. For example, such polymers typically contain some type of internal methyl salicylate "kink" structures such as shown below, and a certain amount of endcap structures indicative of the use of bMSC as shown in units represented by Formula (XVI), Formula (XVII) and Formula (XVIII)

acid, terephthalic acid, or mixtures thereof, it is possible to employ isophthaloyl dichloride, terephthaloyl dichloride, and mixtures thereof.

The polyurethanes may be prepared by reacting a dihydroxy compound of Formula (I) with a diisocyanate compound having Formula (VIII)

$$Q(NCO)_2 \quad \text{(VIII)}$$

wherein Q comprises a divalent aliphatic functionality having 2 to 28 carbons, a divalent cycloaliphatic functionality having 4 to 15 carbons, or a divalent aromatic functionality having 6 to 15 carbons. This reaction can be carried out by methods known in the art.

The epoxide containing polymers can be prepared by reacting a dihydroxy compound of Formula (I) with epichlorohydrin to form a diglycidyl ether compound of Formula (X)

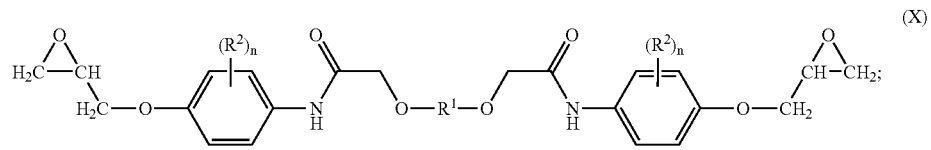

and polymerizing the diglycidyl ether compound of Formula (X) to provide the epoxide-containing polymer having Formula (IX). This reaction can be carried out by methods known in the art.

In addition to the polymers described above, it is also possible to use combinations of the polymer with other thermoplastic polymers, for example combinations of polycarbonates and/or polycarbonate copolymers with polyamides, polyesters, other polycarbonates; copolyester-polycarbonates, olefin polymers such as acrylonitrile butadiene styrene, polystyrene, polyethylene; polysiloxanes, polysilanes and polysulfones. As used herein, a "combination" is inclusive of all mixtures, blends and alloys. In certain embodiments the one or more additional resins may be present preferably in an amount less than or equal to 40 weight percent, more preferably less than or equal to 35 weight percent and most preferably less than or equal to about 30 weight percent based on the total weight of the polymer composition.

In addition to the polycarbonate resin, the thermoplastic composition may include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Exemplary additives include such materials as fillers or reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers and processing aids. The different additives that can be incorporated in the polymer compositions of the present invention are typically commonly used and known to those skilled in the art.

Suitable fillers or reinforcing agents include, for example, silicates and silica powders such as aluminum silicate (mul-

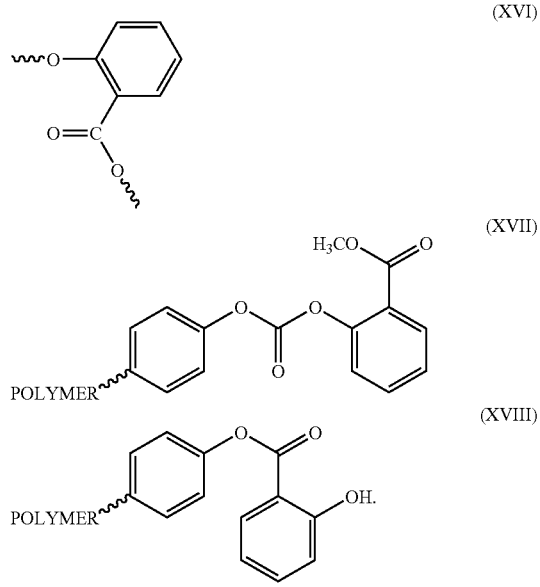

The copolyester-polycarbonate resins may also be prepared by interfacial polymerization. Rather than utilizing the dicarboxylic acid per se, it is possible to employ the reactive derivatives of the acid, such as the corresponding acid halides, in particular the acid dichlorides and the acid dibromides. Thus, for example instead of using isophthalic lite), synthetic calcium silicate, zirconium silicate, fused silica, crystalline silica graphite, natural silica sand, or the like; boron powders such as boron-nitride powder, boron-silicate powders, or the like; oxides such as TiO2, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Suitable thermal stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethyl-benzene phosphonate or the like, phosphates such as trimethyl phosphate, or the like, or combinations comprising at least one of the foregoing heat stabilizers.

Non-limiting examples of antioxidants that can be used in the polymer compositions of the present invention include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl) phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing.

Non-limiting examples of UV stabilizers that can be used include 2-(2'-Hydroxyphenyl)-benzotriazoles, for example, the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, for example, the 6-ethyl-; 6-heptadecyl- or 6-undecyl-derivatives. 2-Hydroxybenzophenones for example, the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis-(2'-Hydroxybenzoyl)-benzenes, for example, 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, for example, phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, for example, alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, for example, 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tertoctylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, for example, methyl stearate; stearyl stearate and pentaerythritol tetrastearate. Mixtures of methyl stearate and hydrophilic and hydrophobic nonionic surfactants comprising polyethylene glycol polymers, polypropylene glycol polymers, and copolymers thereof, for example, methyl stearate and polyethylene-polypropylene glycol copolymers in a suitable solvent; waxes such as beeswax, montan wax, paraffin wax or the like.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene oxide units that may be polyalkylene glycol functionality, for example, polyethylene glycol, polypropylene glycol and polytetramethylene glycol. Such polymeric antistatic agents are commercially available, such as, for example, Pelestat™ 6321 (Sanyo), Pebax™ H1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative.

Non-limiting examples of mold release compositions include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

Non-limiting examples of flame retardants that can be used include potassium diphenylsulfone sulfonate, perfluoroalkane sulfonates and phosphite esters of polyhydric phenols, such as resorcinol and bisphenol A.

The thermoplastic composition may optionally comprise an impact modifier. The impact modifier resin added to the thermoplastic composition in an amount corresponding to about 1 percent to about 30 percent by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifier.

Non-limiting examples of processing aids that can be used include Doverlube® FL-599 (available from Dover Chemical Corporation), Polyoxyter® (available from Polychem Alloy Inc.), Glycolube® P (available from Lonza Chemical Company), pentaerythritol tetrastearate, Metablen® A-3000 (available from Mitsubishi Rayon) and neopentyl glycol dibenzoate.

Radiation stabilizers may also be present in the thermoplastic composition, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol and 1,4-hexandiol.; alicyclic alcohols such as 1,2-cyclopentanediol and 1,2-cyclohexanediol; branched acyclic diols such as 2,3-dimethyl-2,3-butanediol(pinacol), and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol(hexylene glycol), 2-phenyl-2-butanol, 3-hydroxy-3-methyl-2-butanone and 2-phenyl-2-butanol., and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group ($-CH_2OH$) or it may be a member of a more complex hydrocarbon group such as would be the case with ($-CR^{12}HOH$) or ($-CR_2{}^{12}OH$) wherein $R^{12}$ is a complex or a simply hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol.

Where a foam is desired, a blowing agent may be added to the composition. Suitable blowing agents include for example, low boiling halohydrocarbons; those that generate carbon dioxide; blowing agents that are solid at room temperature and that when heated to temperatures higher than their decomposition temperature, generate gases such as nitrogen, carbon dioxide, ammonia gas or the like, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. percent PTFE and about 50 wt. percent SAN, based on the total weight of the encapsulated fluoropolymer. The SAN may comprise, for example, about 75 wt. percent styrene and about 25 wt. percent acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The thermoplastic compositions may be manufactured by methods generally available in the art, for example, in one embodiment, in one manner of proceeding, powdered polymer resin and/or other optional components are first blended, in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a master-batch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures and automotive application. (e.g., forward lighting enclosures for car headlamps).

The disclosure is explained in more detail with reference to the following non-limiting Examples.

EXAMPLES

The molecular weight (Mw) of the polymer was determined by gel permeation chromatography (GPC) on a Shimadzu system, using chloroform at 35° C. through a PLgel 5 μm ($10^3$ Angstrom and $10^5$ Angstrom) column and a UV detector at 254 nanometers and compared relative to polystyrene standards. The glass transition temperature (Tg) of the polymer was analyzed on a DSC2920 equipment from TA and values are in ° C. The polydispersity index (PDI) is the ratio of the weight average molecular weight to the number average molecular weight. The PDI is measured by dissolving the polymer sample (approximately 10 milligrams (mg)) in 1 ml of hexafluoroisopropanol (HFIP) and made up with 9 ml of chloroform ($CHCl_3$). In Example 10 the mobile phase consists of 5 volume percent HFIP in 95 volume percent $CHCl_3$. The chemical resistance of the polymer was assessed by conducting the 'Drop Test' method, where a drop of the test solvent (acetone, methyl ethyl ketone, toluene, or ethanol) was placed on a polymer film (cast from a 10 wt. percent solution of polymer in chloroform). After 1 minute, the drop was wiped off and the chemical resistance was assessed through a visual inspection of the surface for any defects (haziness, sticky residue) and labeled as pass or fail.

Examples 1-8

Preparation of N-(4-hydroxy-phenyl)-2-[4-[(4-hydroxy-phenylcarbomoyl)-methoxy]-phenoxy]-acetamide (HQ-BAAP)-bisphenol A (BPA) copolymer.

The general procedure employed for the preparation of the copolymer is given below. A glass reactor tube was passivated with 0.1 N HCl overnight. The tube was then washed with deionized water a few times followed by water purified using a Milli-Q system and then washed with acetone. The tube was then dried with air. Bismethyl salicyl carbonate (bMSC; 20 g; 0.0606 moles), HQ-BAAP (2.4 g; 0.0059 moles), and bisphenol A (12.09 g; 0.0529 moles) were added to the glass tube. Sodium hydroxide (3.53 micrgrams, $0.088 \times 10^{-6}$ moles) and tetramethyl ammonium hydroxide (TMAH; 536 micro grams, $5.88 \times 10^{-6}$ moles) were added to the reaction mixture. The mixture was then heated to 180° C. The mixture was stirred constantly at this temperature for about 6 minutes. The temperature was then raised to 260° C. and the pressure decreased to $101 \times 10^3$ newtons per meter square atmosphere. After 6 minutes, the pressure was gradually decreased to $10 \times 10^3$ newtons per square meter. After about 10 minutes at this temperature and pressure, the temperature was further raised to 280° C. and the pressure was reduced to 0 Newtons per square meter. The methylsalicylate by-product was constantly removed throughout the reaction. After about 10 minutes at these final conditions, the reactor was brought back to atmospheric pressure (using $N_2$) and the contents were removed. A clear transparent polymer was obtained. The Tg of the polymer samples was in the range of about 140 to 145° C. The melting point of the monomer was determined to be about 270° C. Table 1 indicates the molecular weight and polydispersity index (PDI) of different samples prepared as described above having a HQ-BAAP to BPA ratio of 10:90.

TABLE 1

| Example No | Mw | PDI | Tg ° C. |
|---|---|---|---|
| 1 | 32172 | 2.44 | 142 |
| 2 | 32369 | 2.44 | ND |
| 3 | 32577 | 2.34 | 141 |
| 4 | 26468 | 2.3 | ND |
| 5 | 27680 | 2.5 | ND |
| 6 | 49268 | 3.9 | ND |
| 7 | 23663 | 2.3 | ND |
| 8 | 17777 | 2 | ND |

ND: not determined

Example 9-11

Preparation of N-(4-hydroxy-phenyl)-2-[4-[(4-hydroxy-phenylcarbomoyl)-methoxy]-2-methyl-phenoxy]-acetamide (MeHQ-BAAP)-bisphenol A (BPA) copolymers.

A similar process as followed for Examples 1-8 was employed for Examples 9-11, except that the HQ-BAAP was replaced with MeHQ-BAAP in varying amounts to obtain polymers with varying comonomer ratios with bisphenol A. The results are included in the Table 2 below

TABLE 2

| Example | MeHQ-BAAP/BPA | Mw | PDI | Tg |
|---|---|---|---|---|
| 9 | 10/90 | 34000 | 2.6 | 132 |
| 10 | 25/75 | 79658 | 5.04 | ND |
| 11 | 50/50 | ND | ND | 136 |

ND: Not determined

Films of a polymer having 50 mol % MeHQ-bAAP/50 mol % BPA were exposed to acetone, methyl ethyl ketone and toluene as described above and showed no stickiness or increased haziness after an exposure time of 1 minute.

Example 12

N-(4-hydroxy-phenyl)-2-[4-[(4-hydroxy-phenylcarbomoyl)-methoxy]-phenoxy]-acetamide (HQ-BAAP)-bisphenol A (BPA) copolymer.

Ethylene dichloride (500 ml.), deionized water (300 ml), HQ-BAAP (4.3 g), bisphenol A (45.7 g), p-cumylphenol (0.67 g), and triethylamine (0.44 ml) were charged to a 2 liter flask equipped with mechanical agitation, condenser, and a caustic vent scrubber. Phosgene (27.5 g) was added at a rate of 2.0 g/minute with vigorous stirring while a 50 wt. percent solution of sodium hydroxide was added at a rate to maintain a pH of 9 to 10. After phosgene addition was complete, the batch was purged with nitrogen for 10 minutes to ensure complete removal of phosgene. Stirring was stopped, but no phase separation was observed. The reactor contents were transferred to a 2 liter separating funnel, and 1N HCl (500 ml) was charged to the funnel in 50 ml increments and the contents shaken and vented after each acid addition. After the acidification, the phases were allowed to separate on standing.

The resultant organic phase containing polymer was washed with 1N HCl (1×500 ml) and then with deionized water (3×500 ml). The washed polymer solution was then slowly fed into approximately 2 liter of hot water with rapid stirring to flash off the ethylene dichloride, and the resulting white polymer was isolated by filtration and dried in air at 110° C. overnight to provide a 5 mole percent HQ-BAAP polymer.

Example 13

Methylene dichloride (500 ml.), deionized water (300 ml), HQ-BAAP (32.1 g), bisphenol A (17.92 g), p-cumylphenol (0.50 g), and triethylamine (0.33 ml) were charged to a 2 liter flask equipped with mechanical agitation, condenser, and a caustic vent scrubber. Phosgene (20.4 g) was added at a rate of 1.0 g/minute with vigorous stirring while a 50 wt. percent solution of sodium hydroxide was added at a rate to maintain a pH of 9 to 10. After phosgene addition was complete, the batch was purged with nitrogen for 10 minutes to ensure complete removal of phosgene. Stirring was stopped, but no phase separation was observed. The reactor contents were transferred to a 2 liter separating funnel, and 1N HCl (500 ml) was charged to the funnel in 50 ml increments and the contents shaken and vented after each acid addition. After the acidification, the phases were allowed to separate on standing.

The resulting organic phase containing polymer was washed with 1N HCl (1×500 ml) and then with deionized water (3×500 ml). The washed polymer solution was then slowly fed into approximately 2 liter of hot water with rapid stirring to flash off the methylene dichloride, and the resulting white polymer was isolated by filtration and dried in air at 110° C. overnight to provide a 50 mole percent HQ-BAAP polymer.

Example 14

Methylene dichloride (200 ml.), deionized water (300 ml), HQ-BAAP (4.87 g), bisphenol A (18.79 g), p-cumylphenol (0.30 g), and triethylamine (0.13 ml) were charged to a 2 liter flask equipped with mechanical agitation, condenser, and a caustic vent scrubber. Phosgene (12.2 g) was added at a rate of 1.0 g/minute with vigorous stirring while a 50 wt. percent solution of sodium hydroxide was added at a rate to maintain a pH of 9 to 10. After phosgene addition was complete, the batch was purged with nitrogen for 10 minutes to ensure complete removal of phosgene. Stirring was stopped, but no phase separation was observed. The reactor contents were transferred to a 2 liter separating funnel, and 1N HCl (500 ml) was charged to the funnel in 50 ml increments and the contents shaken and vented after each acid addition. After the acidification, the phases were allowed to separate on standing.

The resulting organic phase containing polymer was washed with 1N HCl (1×500 ml) and then with deionized water (3×500 ml). The washed polymer solution was then slowly fed into approximately 2 liters of hot water with rapid stirring to flash off the methylene dichloride, and the resulting white polymer was isolated by filtration and dried in air at 110° C. overnight to provide a 50 mole percent HQ-BAAP polymer.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A polymer comprising at least one structural unit derived from a dihydroxy compound of Formula I

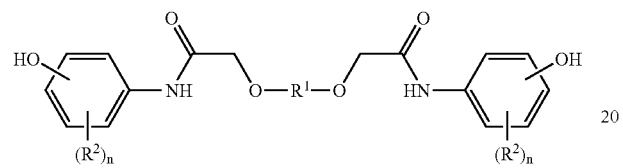

wherein $R^1$ is an aromatic functionality having 6 to 60 carbons, $R^2$ at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4.

2. The dihydroxy aromatic compound of claim 1 wherein the aromatic divalent functionality $R^1$ is derived from a dihydroxy aromatic compound having Formula (II)

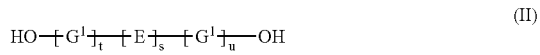

wherein each $G^1$ is independently at each occurrence an aromatic functionality having 6 to 20 carbons; E is independently at each occurrence, a cycloaliphatic functionality having 3 to 20 carbons, an aromatic functionality having 6 to 20 carbons, an aliphatic functionality having 1 to 20 carbons, a sulfur-containing linkage, a selenium-containing linkage, a phosphorus-containing linkage, or an oxygen atom; "t" is a number greater than or equal to one and less than or equal to 10,000; "s" is either zero or one; "u" is a whole number including zero to 10,000.

3. The polymer of claim 1, wherein the polymer is a polycarbonate, a polyester, a copolyestercarbonate, a polyurethane or an epoxide-containing polymer.

4. The polycarbonate of claim 3 comprising repeating structural carbonate units of the Formula (III)

wherein at least about 60 percent of the total number of $R^4$ groups are aromatic functionalities and the balance thereof are aliphatic, alicyclic, or aromatic functionalities and further wherein at least one $R^4$ group is a structural unit derived from a dihydroxy compound of Formula (I).

5. The polycarbonate of claim 3, comprising about 1 to about to about 100 mole percent of $R^4$ units derived from a dihydroxy compound of Formula (I).

6. The polycarbonate of claim 3, further comprising structural units derived from bisphenol A.

7. The polycarbonate of claim 3, further comprising at least one structural unit having Formula (XVI), Formula (XVII) and Formula (XVIII)

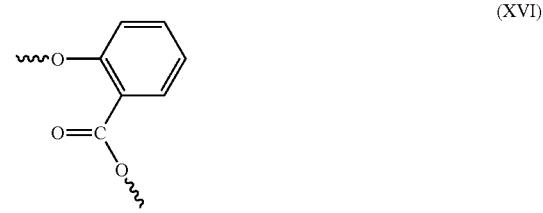

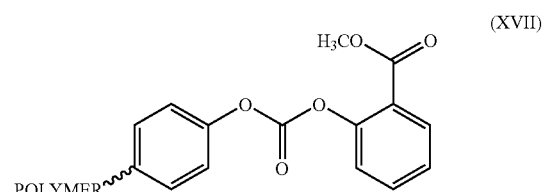

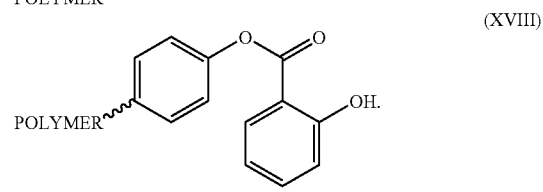

8. The polyester of claim 3 comprising repeating structural units of the Formula (V)

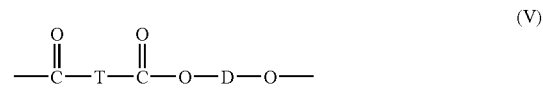

wherein "D" is derived from a divalent radical derived from a dihydroxy compound, further wherein at least one of "D" are derived from a dihydroxy compound of Formula (I); and wherein "T" is a divalent functionality derived from a dicarboxylic acid.

9. The polyester of claim 8, further comprising at least one structural unit having Formula (XVI), Formula (XVII) and Formula (XVIII)

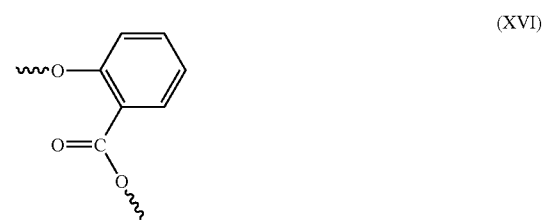

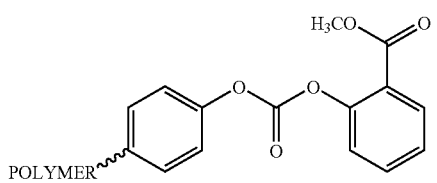
(XVII)

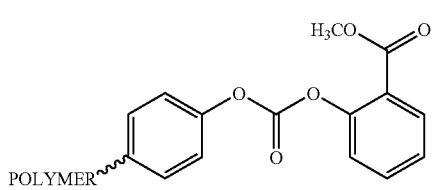
(XVIII)

10. The copolyestercarbonate of claim 3, comprising structural units of Formula (III)

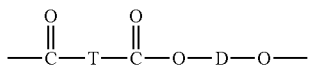
(III)

wherein at least about 60 percent of the total number of $R^4$ groups are aromatic functionalities and the balance thereof are aliphatic, alicyclic, or aromatic functionalities and structural units of Formula (V)

$$—\overset{O}{\underset{}{C}}—T—\overset{O}{\underset{}{C}}—O—D—O—$$ (V)

wherein "D" is a divalent functionality derived from a dihydroxy compound; and wherein at least one $R^4$ group, at least one of D group or at least one of $R^4$ and at least one of D are derived from a dihydroxy compound of Formula (I) and wherein T is a divalent functionality derived from a dicarboxylic acid.

11. The copolyestercarbonate of claim 10, further comprising at least one structural unit having Formula (XVI), Formula (XVII) and Formula (XVIII)

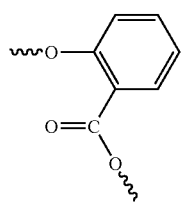
(XVI)

(XVII)

12. A polycarbonate comprising at least one structural unit derived from a dihydroxy compound of Formula (XI)

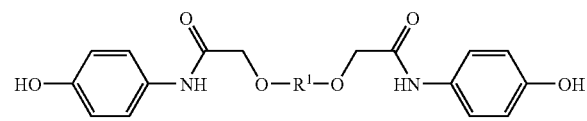
(XI)

wherein $R^1$ is a aromatic divalent functionality derived from hydroquinone, methyl hydroquinone, resorcinol or bisphenol A.

13. A process for preparing a polymer, comprising polymerizing a dihydroxy compound of Formula (I), (I)

wherein $R^1$ is an aromatic functionality having 6 to 60 carbon atoms, $R^2$ at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4.

14. The process of claim 13, wherein said polymerizing comprises
dissolving or dispersing a dihydroxy compound of Formula (I) in an aqueous base;
adding the resulting mixture to a water-immiscible solvent to form an interfacial mixture; and
contacting the interfacial mixture with a carbonate precursor in the presence of a catalyst under controlled pH conditions to form a polycarbonate.

15. The process of claim 13, wherein the aqueous base comprises sodium hydroxide, potassium hydroxide, or a combination thereof.

16. The process of claim 13, wherein the carbonate precursor comprises a carbonyl halide, a haloformate, a bishaloformate of a glycol, an ester, or a mixture of two or more of the foregoing carbonate precursors.

17. The process of claim 13, wherein the catalyst comprises triethylamine, a phase transfer catalyst, or a combination thereof.

18. The process of claim 13, wherein the water-immiscible solvent comprises methylene chloride, 1,2-dichloroethane, chlorobenzene, toluene, or a combination of two or more of the foregoing solvents.

19. The process of claim 13, wherein pH is maintained at a pH of about 8 to about 10.

20. The process of claim 13, wherein said polymerizing comprises reacting, in a molten state, the dihydroxy compound of Formula (I) and a diaryl carbonate ester, in the presence of a transesterification catalyst to form a polycarbonate.

21. The process of claim 20, wherein the diaryl carbonate ester comprises diphenyl carbonate, bis(methyl salicyl) carbonate, or a combination thereof.

22. The process of claim 13, wherein said polymerizing comprises
reacting a dihydroxy compound of Formula (I) with a dicarboxylic acid compound of Formula (XII)

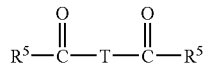

(XII)

wherein $R^5$ is independently at each occurrence hydroxy, chloro, or $OR^6$, wherein $R^6$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality comprising a cycloaliphatic functionality having 6 to 10 carbon atoms, an aromatic functionality having 6 to 20 carbon atoms, or an aliphatic functionality having 2 to 10 carbon atoms.

23. The process of claim 13, wherein said polymerizing comprises
reacting a dihydroxy compound of Formula (I) with a carbonate precursor and a dicarboxylic acid compound of Formula (XII)

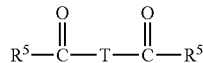

(XII)

wherein $R^5$ is independently at each occurrence hydroxy, chloro, or $OR^6$, wherein $R^6$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality comprising a cycloaliphatic functionality having 6 to 10 carbon atoms, an aromatic functionality having 6 to 20 carbon atoms, or an aliphatic functionality having 2 to 10 carbon atoms.

24. A polycarbonate prepared according to the process of claim 14.

25. A polycarbonate prepared according to the process of claim 20.

26. A polyester prepared according to the process of claim 22.

27. A copolyestercarbonate prepared according to the process of claim 23.

28. A thermoplastic composition comprising a polymer comprising at least one structural unit derived from a dihydroxy compound of Formula (I)

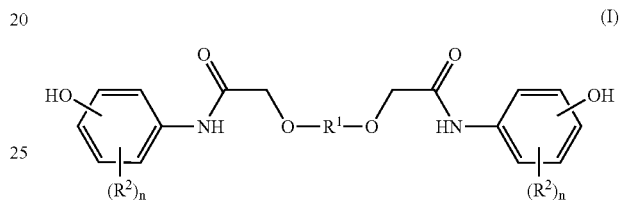

(I)

wherein $R^1$ is an aromatic functionality having 6 to 60 carbons, $R^2$ at each occurrence can be the same or different and is independently at each occurrence selected from the group consisting of a cyano functionality, a nitro functionality, a halogen, an aliphatic functionality having 1 to 10 carbons, a cycloaliphatic functionality having 3 to 10 carbons and an aromatic functionality having 6 to 10 carbons and further wherein "n" is an integer having a value 0 to 4.

29. The thermoplastic composition of claim 26, further comprising an additive selected from the group consisting of fillers, reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers, processing aids, and combinations of two or more of the foregoing additives.

30. An article comprising the composition of claim 26.

31. A method of manufacture of an article comprising molding, extruding, or shaping the composition of claim 27 into an article.

* * * * *